United States Patent
Nishimura et al.

[11] Patent Number: 5,802,716
[45] Date of Patent: Sep. 8, 1998

[54] METHOD FOR BONDING A VALVE SEAT WITH A CYLINDER HEAD

[75] Inventors: Akihisa Nishimura, Nagoya; Fumio Shimizu, Toyota; Kenichi Suzuki, Nagoya, all of Japan

[73] Assignees: Toyota Jidosha Kabushiki Kaisha, Toyota; Kabushiki Kaisha Toyota Chuo Kenkyusho, Aichi-gun, both of Japan

[21] Appl. No.: 534,611

[22] Filed: Sep. 27, 1995

[30] Foreign Application Priority Data

Sep. 30, 1994 [JP] Japan .................................. 6-237462
Feb. 22, 1995 [JP] Japan .................................. 7-059755

[51] Int. Cl.⁶ ............................................. B23P 15/00
[52] U.S. Cl. ................................. 29/888.06; 29/888.46
[58] Field of Search ........................... 29/888.06, 888.44, 29/888.46, 428; 228/262.43, 208, 223, 224; 123/188.8

[56] References Cited

U.S. PATENT DOCUMENTS

| | | | |
|---|---|---|---|
| 3,170,452 | 2/1965 | Dobovan | 123/188 |
| 4,619,716 | 10/1986 | Suzuki et al. | |
| 4,655,385 | 4/1987 | Suzuki et al. | |
| 4,670,067 | 6/1987 | Suzuki et al. | |
| 4,689,092 | 8/1987 | Suzuki et al. | 148/26 |
| 5,171,377 | 12/1992 | Shimizu et al. | |

FOREIGN PATENT DOCUMENTS

| | | |
|---|---|---|
| 0 092 081 | 10/1983 | European Pat. Off. |
| 0 140 267 | 5/1985 | European Pat. Off. |
| 58-74266 | 5/1983 | Japan |
| 61-33752 | 2/1986 | Japan |
| 52-168669 | 7/1987 | Japan |
| 62-173065 | 7/1987 | Japan |
| 1-186261 | 7/1989 | Japan |
| 3-210961 | 9/1991 | Japan |
| 58-74265 | 5/1993 | Japan |
| 5-287324 | 11/1993 | Japan |
| 5-332106 | 12/1993 | Japan |
| 5-340299 | 12/1993 | Japan |
| 0 394 839 | 7/1933 | United Kingdom |

*Primary Examiner*—Irene Cuda
*Attorney, Agent, or Firm*—Kenyon & Kenyon

[57] ABSTRACT

A method for bonding valve seats for intake and exhaust valves to an engine cylinder head. Valve seats are brazed to an aluminum cylinder head using an Al—Zn type brazing material and a fluoride type flux. The brazing material contains 70 to 90 % by weight of Zn. The brazing is preferably carried out at a temperature of 470° to 520° C. To allow the brazing material and flux to be present between the cylinder head and each valve seat, the cylinder head contains U-grooves formed around the opening of each intake or exhaust port. The U-groove consists of an annular step formed along the opening of the intake or exhaust port and a bank extended along the inner circumference of the step. The valve seats are placed in the U-grooves, which are then filled with the brazing material and flux, to carry out brazing of the valve seats onto the cylinder head. After completion of the brazing, the banks are removed to complete bonding of the valve seats to the cylinder head. In another method, a valve seat is directly bonded to a cylinder head by applying a fluoride type flux on the valve seat.

12 Claims, 8 Drawing Sheets

METHOD FOR BONDING A VALVE SEAT WITH A CYLINDER HEAD

BACKGROUND OF THE INVENTION

1. Field of the Invention

The present invention relates generally to a valve seat, for example, for intake valve and exhaust valve disposed in a cylinder head of an automotive engine. More particularly, the present invention relates to a method for bonding a valve seat to a cylinder head and also to a cylinder head suitable for the method.

2. Description of the Related Art

Generally, an automotive engine cylinder head has intake ports opened and closed by intake valves and exhaust ports opened and closed by exhaust valves. These ports are repeatedly subjected to high heat stress caused by air cooling during the intake stroke and heating during the combustion stroke. Accordingly, each port undergoes great heat fatigue.

Under such circumstances, a structure was proposed in which such heat fatigue is prevented by casting a high melting point heat-resistant metal to sites where high heat resistance is required. In this structure, heat fatigue is moderated by pouring the heat-resistant metal around the valve seats applied to the opening edges of the intake ports and exhaust ports to locate the heat-resistant metal at the sites where heat fatigue is liable to occur.

Japanese Unexamined Patent Publication Nos. Sho 58-74265 and Sho 58-74266 each disclose a method for integrating a valve seat for an intake port and a valve seat for an exhaust port, which are combined into one body, when an aluminum cylinder head is cast. Japanese Unexamined Patent Publication No. Hei 1-18261 discloses a method for integrating iron type metal valve seats into a cast iron cylinder head when it is molded by casting. Japanese Unexamined Patent Publication No. Hei 3-210961 discloses carburizing treatment of valve seat surfaces when iron type metal valve seats are integrated into a cast iron cylinder head by casting so as to improve bondage between the valve seat and the cylinder head. Further, there is a method already in practical use, in which valve seats made of a sintered material containing an iron type metal are integrated into an aluminum cylinder head by casting.

Meanwhile, higher power and higher revolution automotive engines are being currently produced. Valve seats employed in such engines are required to exhibit excellent wear resistance under high temperature conditions. In order to satisfy this requirement, iron type sintered alloys containing metallic elements such as Cr, Ni, Co and Mo are suitably employed in the current valve seats. This type of valve seat must be fixed firmly to the opening of the intake port and the exhaust port. However, since the valve seat and the cylinder head are made of different materials, they must be formed independently. There is an alternative method, which is different from the casting method, in which the valve seat is press-fitted into a recess formed on the cylinder head. Japanese Unexamined Patent Publication No. Hei 5-287324 discloses a method for bonding a valve seat with a cylinder head, in which a valve seat infiltrated with a metal such as Cu and Al is subjected to resistance welding or the like. Further, Japanese Unexamined Patent Publication No. Hei 5-332106 discloses a method for forming metallic bond between valve seats and a cylinder head by explosive pressure welding.

However, in the press-fitting method, it is quite common for a thermal air insulation layer to be formed between the pressed in valve seat and the cylinder head, and as a result of this, the transmission of heat from the valve seat to the cylinder head can be substantially impeded. It is difficult to obtain a satisfactory bond between special valve seats, which are infiltrated with materials such as Cu and Al, and the cylinder head by resistance welding or the like in a large area between valve seats and cylinder head, hence the resulting heat conductivity is below a desired value. The explosive pressure welding method, while producing satisfactory results, has many limitations when applied in the production line.

Furthermore, in order to strengthen the portion of the cylinder head itself which receives the valve seat to reliably hold the valve seat when the valve seat is pressed into the cylinder head, the valve seat diameter and intake and exhaust poppet valve diameter must be restricted. Under these circumstances, it is difficult to increase the efficiency of the cooling system for the cylinder head by making the coolant passages within the cylinder head closely approach the valve seats and combustion chambers. Thus, it is difficult to enhance the engine performance.

SUMMARY OF THE INVENTION

Accordingly, it is a primary objective of the present invention to provide a method for bonding a valve seat with a cylinder head such that heat conductivity between the valve seat and the cylinder head is improved. Further, the method improves anti-knocking properties of the engine by controlling the temperature rise of the valve seat. A cylinder head suitable for the method is also provided.

To achieve the foregoing and other objects in accordance with the purpose of the present invention, the method for bonding a valve seat with a cylinder head includes a step of bonding a valve seat made of iron type metal and a cylinder head made of aluminum with a fluoride type flux. The bonding step includes brazing the valve seat with the cylinder head by using an Al—Zn type brazing material and the fluoride type flux. Another bonding step includes a step of applying the fluoride type flux on the valve seat.

To achieve the foregoing and other objects in accordance with the purpose of the present invention, a structure of an engine block for the method mentioned above, includes a cylinder head and a combustion chamber communicating with a pneumatic passage. The pneumatic passage has an opening directed to the combustion chamber that is selectively opened and closed by a valve. The structure includes an annular step surrounding said opening and an annular bank connected to and extending opposedly parallel to the annular step. The annular bank and the annular step define a U-shaped groove therebetween for accommodating the valve seat.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

FIGS. 1 through 7 are drawings according to a first embodiment of the invention:

FIGS. 8 through 11 are drawings according to a second embodiment of the invention:

FIGS. 12 through 14 are drawings according to another embodiment of the invention:

FIG. 13 shows a vertical cross-sectional view (a) illustrating a step of brazing the valve seat in a U-groove and a horizontal cross-sectional view (b)

DETAILED DESCRIPTION OF THE PREFERRED EMBODIMENTS

Now, a method for bonding a valve seat with a cylinder head, as well as, a cylinder head suitably used in the method of the present invention will be described according to a first embodiment.

The bonding method according to this embodiment is intended to bond a valve seat to an aluminum cylinder head. According to this method, the valve seat is bonded to the head by brazing the seat onto the head using an Al—Zn type brazing material and a fluoride type flux.

The brazing material for aluminum is an Al—Si type brazing material. Composition of the aluminum cylinder head is an Al—Si type alloy. Accordingly, the Al—Si type brazing material is not suitable for brazing, because the melting point of the brazing material is approximate to that of the cylinder head. Accordingly, a brazing material is needed that has a melting point lower than that of the cylinder head and that does not melt within the temperature range (up to 300° C.) of the cylinder head when the engine is operated. The following are such type of brazing material: Al—Zn type alloys (eutectic temperature 382° C.), Al—Mg type alloys (eutectic temperature 437° C.), Mg—Zn type alloys (eutectic temperature 340° C), Mg—Pb type alloys (eutectic temperature 466° C.), Mg—Cu type alloys (eutectic temperature 485° C.), Ag—Mg type alloys (eutectic temperature 472° C.).

When brazing is carried out, it is essential that the flux should have an activation temperature within the brazing temperature range and it should be a noncorrosive flux employable for aluminum which is used for removing oxides formed on the metal surface (a material which does not corrode the matrix, if remains after brazing). As such flux, fluoride type fluxes can be used. Since fluoride type fluxes react preferentially with Mg, the brazing material containing Mg exhibits a lowered effect of removing oxides present at to-be-soldered portions, inhibiting the brazing effect.

Accordingly, an Al—Zn type brazing material can be selected as a suitable brazing material. As the Al—Zn type brazing materials, Al—Zn based materials containing Si, Cu, etc. can be employed. Particularly, spreading of the brazing material can further be improved by admixing a small amount (about 0.5 % by weight) of Si. In an Al—Zn brazing material, Zn is preferably contained in an amount of at least 70% by weight.

The fluoride type flux includes, for example, xCsF·(100−x)AlF$_3$, wherein 50≦x≦65 (mol %). The flux may contain 5 mol % or less of KF, LiF, NaF, Cs$_2$CO$_3$, Al(OH)$_3$, etc.

Figure 6:
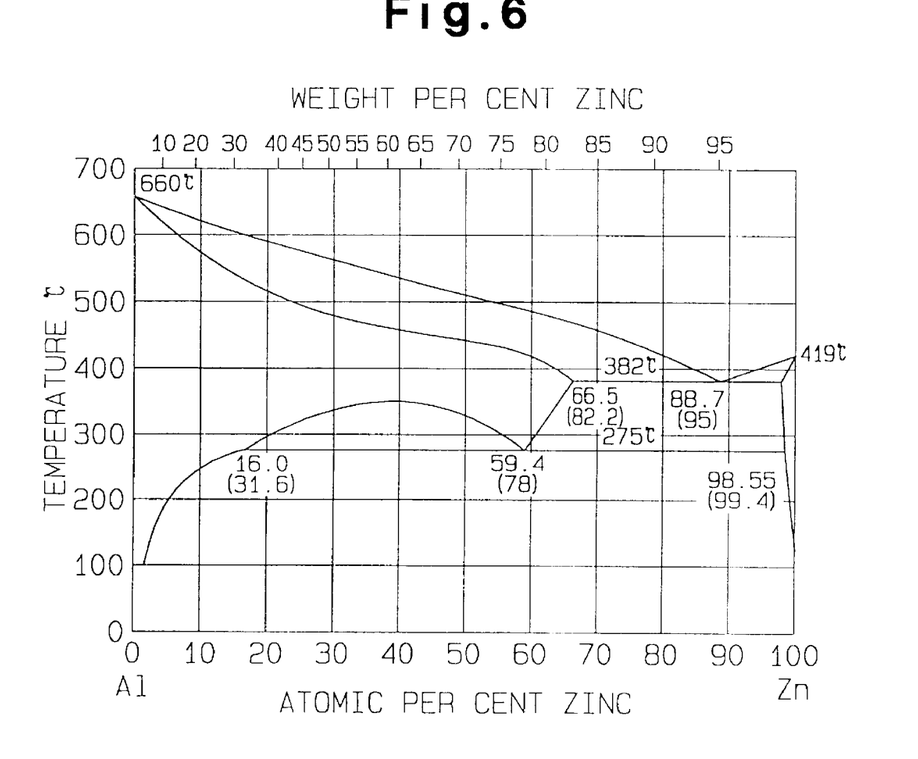
FIG. 6 shows a phase diagram of an Al—Zn system.

The graph of FIG. 6 shows a phase diagram of the Al—Zn system. In this diagram, the abscissa shows atomic % and weight % of Zn; whereas the ordinate shows temperature. Eutectic temperature of the Al—Zn type brazing material containing 95% by weight of Zn is 382° C. If the Al—Zn type brazing material contains more than 95% by weight of Zn, the ductility of the material becomes too low to be processed into a desired shape. Accordingly, it is necessary in the Al—Zn type brazing materials to increase the Al content as much as possible. However, since the melting point of the aluminum cylinder head is 520° to 580° C., the melting point of the brazing material should be 500° C. or lower. The melting point of the brazing material is preferably in the range of 430° to 500° C.

Figure 7:
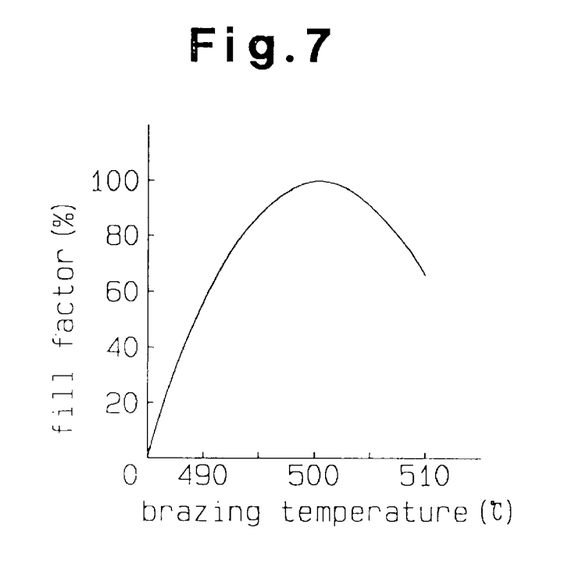
FIG. 7 shows a graph illustrating a relationship between brazing temperature and the fill factor of the brazing material.

In a particularly preferred brazing material composition, Zn is contained in an amount of 70 to 90% by weight of the total amount of Al and Zn in the bonding method described above. The graph of FIG. 7 shows a relationship between the brazing temperature and the fill factor of the brazing material in the brazing clearance. It should be noted here that the brazing material is of the Al—Zn type containing 78% by weight of Zn. In this graph, spreading of the brazing material is poor at a brazing temperature of lower than 500° C., so that the fill factor is low; whereas the fill factor of the brazing material is also low at a brazing temperature of higher than 500° C. because the brazing material diffuses through the matrix. The higher fill factor of the brazing material, the greater the brazing area and higher the brazing strength and heat conductivity. Accordingly, brazing is carried out most suitably using an Al—Zn type brazing material (melting point: mps 425° C., mpl 483° C.) containing 78% by weight of Zn at a brazing temperature of about 500° C. On the same ground, in the case of an Al—Zn type brazing material containing 90% by weight of Zn and in the case of an Al—Zn type brazing material containing 70% by weight of Zn, brazing is most suitably carried out at a brazing temperature of about 470° C. to about 520° C., respectively. In short, the brazing temperature is preferably in the range of 470° to 520° C.

Figure 3:
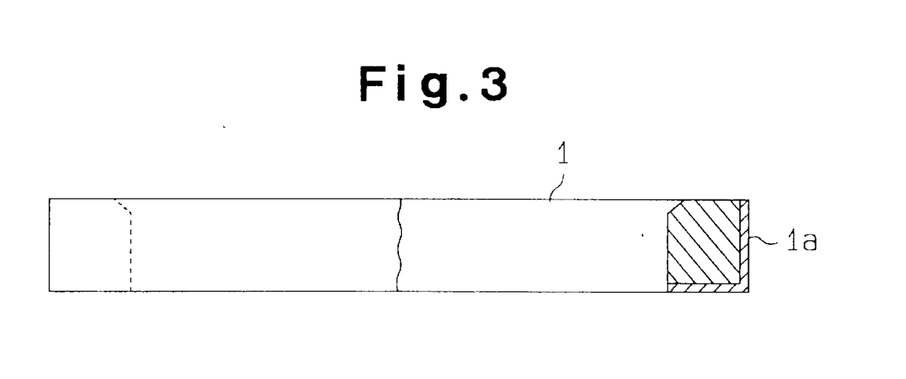
FIG. 3 shows a partially cut-away side view of the valve seat.
Figure 5:
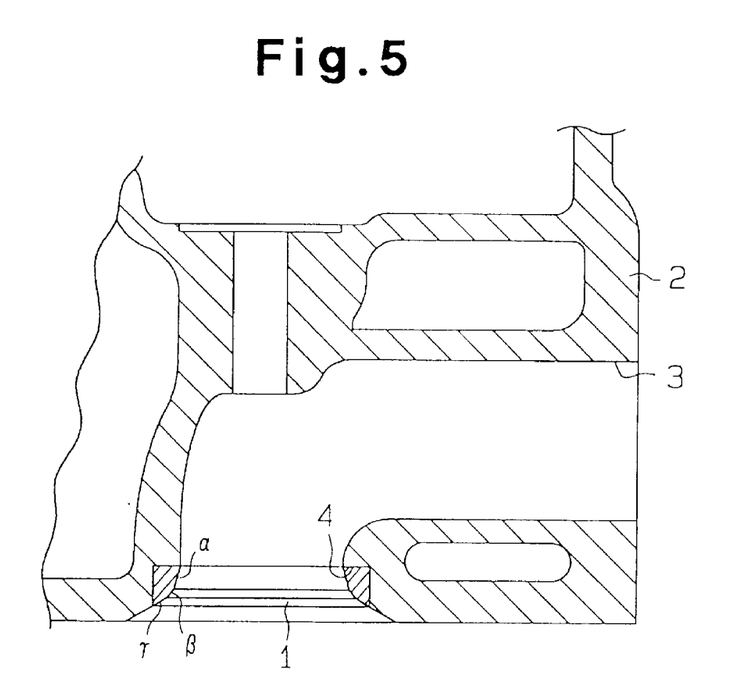
FIG. 5 shows a partial cross-sectional view of the cylinder head and the valve seat completely bonded to each other.

This embodiment will be described more specifically with reference to the attached drawings. FIG. 5 shows a valve seat 1 bonded along an opening of a port 3 in a cylinder head 2. The cylinder head 2, which is molded by casting an Al—Si type alloy, has a port 3, and the opening of the port 3 contains an annular step 4. The annular valve seat 1, which is secured to the step 4 by brazing, is composed of an iron type sintered alloy containing an alloying elements such as Cr, Ni, Co, Mo, etc. As shown in FIG. 3, faces of the valve seat 1, particularly the circumferential face and the bottom face, which are to be bonded with the cylinder head 2, contain a nickel layer 1a formed by Ni—P type electroless plating. The reason why the nickel layer 1a is formed is that Ni improves wettability of a brazing material (to be described later) and affinity between the iron in the valve seat 1 and the Al—Zn type brazing material.

Figure 1:
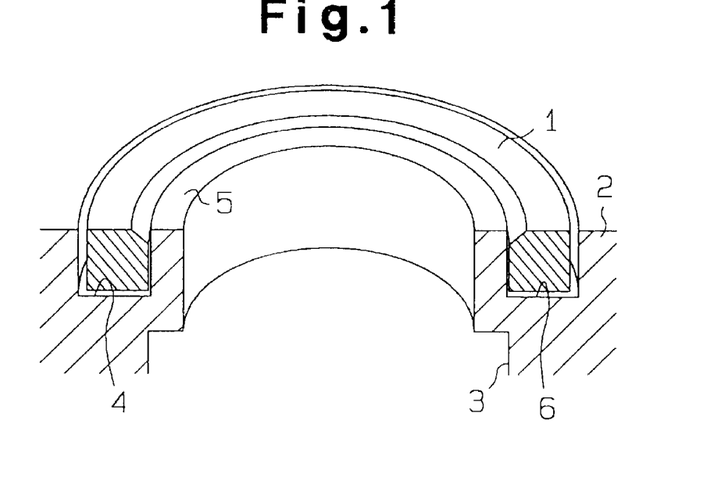
FIG. 1 shows a partially cut-away perspective view of a valve seat disposed around the opening of a port in a cylinder head.

As shown in FIG. 1, the cylinder head 2, immediately after cast molding, has an annular bank 5 extended along the inner circumference of the step 4 of the port 3. The bank 5 and the step 4 together form an annular U-groove 6. The bank 5 is formed integrally with the port 3 to protrude from the inner wall of the port 3 toward the center of the port 3. For convenience's sake, FIGS. 1 and 2 are illustrated upside down with respect to FIG. 5.

Figure 2:
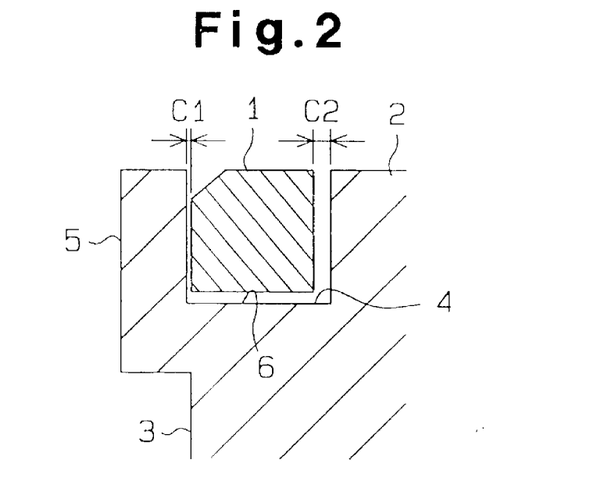
FIG. 2 shows a cross-sectional view of a U-groove formed around the opening of the port and a valve seat fitted in the groove.

As shown in FIG. 2, a predetermined clearance C2 is secured between the outer circumference of the valve seat 1 located in the U-groove 6 and the inner circumference of the step 4. Meanwhile, a predetermined clearance C1 (C1<C2) is secured between the inner circumference of the valve seat 1 and the outer circumference of the bank 5. It should be noted here that the valve seat 1 is positioned in such a way that it may not be brazed with the bank 5 as offset from the U-groove 6 (step 4). However, when the valve seat 1 is not to be brazed with the bank 5, the predetermined clearance C1 may be zero.

In this embodiment, to apply the valve seat 1 to the cylinder head 2, an annular bank 5 is formed along the inner circumference of the annular step 4 to define a U-groove 6. After a brazing material 7 and a flux 8 are charged, the valve seat 1 is disposed in the U-groove 6. The valve seat 1 is then brazed in the U-groove 6, and the bank 5 is cut off. Accordingly, the valve seat 1 located in the U-groove 6 can be positioned and brazed without offsetting from the port 3. Further, the brazing material 7 and flux 8 are prevented from flowing from the U-groove 6 to the port 3.

Thus, the cylinder head 2 having a U-groove 6 formed around the port 3 is well suited for the method for bonding the valve seat 1 using a brazing material 7 and a flux 8 like in this embodiment.

Next, the method for bonding the valve seat 1 to the U-groove 6 of the port 3 will be described.

Figure 4:
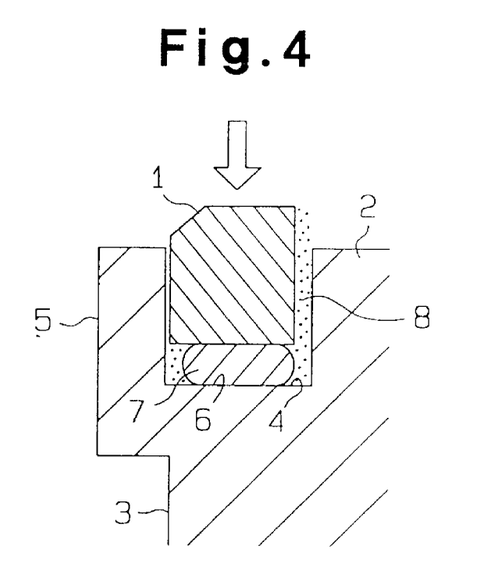
FIG. 4 shows in cross-sectional view how the valve seat is brazed in the U-groove.

First, as shown in FIG. 4, a brazing material 7 and a fluoride type flux 8 are placed in the U-groove 6. More specifically, the brazing material 7 is placed entirely over the bottom of the U-groove 6, and then the flux 8 is charged throughout the U-groove 6. Here, an Al—Zn type brazing material containing 78% by weight of Zn is used. As the fluoride type flux 8, 55 mol % CsF-45 mol % $AlF_3$ (activation temperature: 440° to 580° C.) is used.

Subsequently, as shown in FIG. 4, the valve seat 1 is fitted in the U-groove 6 with the predetermined clearances C1, C2 being secured. The valve seat 1 is then pressed against the cylinder head 2, as the arrow shows in FIG. 4, using a clamp or the like. In this pressed state, the valve seat 1 is introduced together with the cylinder head 2 into a furnace (not shown) and heated up to about 500° C. The heating in the furnace is preferably started at the dew point minus 30° C. under a nitrogen atmosphere.

When the heating temperature approaches 500° C., the flux 8 is activated. The activated flux 8 removes oxides formed on the brazing surfaces of the valve seat 1, step 4 and bank 5. When the brazing material 7 is melted, it spreads throughout the clearances defined between the valve seat 1 and the step 4 and the bank 5 to fill them up.

Subsequently, the bonding region is cooled, and the bank 5 is removed using a cutting machine or the like. At the same time, three faces of the valve seat 1 are machined. The three faces of the valve seat 1 which are to be machined are the inner circumferential face α, which is not in contact with the step 4, the seat surface β, which is to contact a valve, and the bottom face γ, which is exposed to the combustion chamber.

According to the above-described bonding method, the valve seat 1 is brazed to the aluminum cylinder head 2 by the Al—Zn brazing material 7 and the fluoride type flux 8. Thus, the metal filled between these two members 1, 2 increases the bonding area to improve heat conductivity between the valve seat 1 and the cylinder head 2. As a result, the temperature of the valve seat 1 can be lowered. The lowered temperature of the valve seat 1 reduces engine knocking. Further, the valve seat 1 need not have a fitting depth unlike the valve seat by press fitting method, so that the thickness of the valve seat 1 can be reduced that much. Further, the reduction of the thickness of casting wall between the valve seat 1 allows the valve seat diameter and the port diameter to be increased, which improves the efficiency of conveying air to the combustion chamber, engine power, and fuel consumption. Moreover, the thinning of the valve seat 1 reduces the amount of material used.

In the above description, valve seats 1 are brazed to the ports 3 associated with the engine cylinders respectively. In a four-cylinder engine, valve seats 1 were brazed as described above to a cylinder head 2 at locations corresponding to two of the cylinders. Further, for the purpose of comparison, valve seats 1 were press fitted to the steps 4 of the cylinder head 2 at locations corresponding to the remaining two cylinders.

The engine containing the valve seats 1, half of which were brazed and the rest being press-fitted, was operated at 6000 rpm to measure the temperature of the valve working faces, i.e. the seat surfaces β of the valve seats 1. As a result, the brazed valve seats 1 had an average temperature of 248° C. on the seat surface β; whereas the press-fitted valve seats had an average temperature of 282° C. on the seat surface β. Thus, the brazed valve seats 1 exhibit a better cooling effect than the press-fitted valve seats.

Bond strength of the brazed valve seats 1 was compared with that of the press-fitted valve seats. As a result, while the bond strength achieved by press-fitting was about 1 kgf/$mm^2$, the bond strength achieved by brazing was 10 times as much.

The nickel layer 1a applied to the bonding surfaces of the valve seat 1 in this embodiment inhibits formation of aluminum intermetallic compounds caused by diffusion of iron in the valve seat 1 and the brazing material 7. Further, wettability of the brazing material 7 against the valve seat 1 is improved to achieve bonding between the valve seat 1 and the cylinder head 2.

Since an Al—Zn type brazing material 7 containing 78% by weight of Zn is used in this embodiment, valve seats 1 were brazed to the aluminum cylinder head 2 by a material having a melting point equal to or lower than that of the cylinder head 2. Namely, brazing can be carried out at the melting point of the cylinder head 2 or lower.

The brazing temperature is set to about 500° C. in this embodiment, so that the brazing material 7 spreads well to show the improved fill factor between the valve seat 1 and the cylinder head 2, providing maximum brazing area and brazing strength between these two members 1, 2 while increasing heat conductivity between the valve seat 1 and the cylinder head 2.

Next, a method for bonding a valve seat to a cylinder head will be described according to a second embodiment.

The method for bonding a valve seat to a cylinder head according to this embodiment is one to bond a valve seat made of an iron type material to an aluminum cylinder head. In this method, after a fluoride type flux is applied to the valve seat, the valve seat and the cylinder head are brazed to each other.

It is generally difficult to bond valve seats to an aluminum cylinder head through metallurgical bonding. The reason is that iron oxides and aluminum oxides, which cannot be removed, are present at the interface between the valve seats and the cylinder head when a hot melt of aluminum is poured into a casting die. The fluoride type flux employed in this embodiment is intended to remove such oxides, and a noncorrosive flux for aluminum that does not corrode the aluminum cylinder head is used. Such flux includes $KF-AlF_3$ type, $CsF-AlF_3$ type, $KF-CsF-AlF_3$, $CsF-AlF_3-Al(OH)_3$, $KF-AlF_3-LiF$ and $CsF-AlF_3-LiF$. Since these fluxes contain no chloride, they do not cause the valve seats or cylinder heads to corrode. In a convenient method of applying the flux, a fluoride type flux is dispersed in a solvent such as ethyl alcohol, and the valve seats are immersed in the dispersion.

This application method is preferred in that the flux can be quickly dried after immersion and the flux can be applied uniformly on the valve seats. However, the application method is not limited to this.

In carrying out bonding, it is possible to achieve a metallurgical bonding between the valve seat and the cylinder head. However, brittle iron-aluminum intermetallic compounds are formed at the interface between the valve seat and the cylinder head. Accordingly, the valve seat is preferably coated on the surface with a metal, other than iron or aluminum, that has good affinity with the valve seat and the cylinder head.

Thus, the valve seat is coated on the surface with a metal having good affinity with the valve seat and the cylinder head before the fluoride type flux is applied to the valve seat. Metals having good affinity with the valve seat and cylinder head include nickel, copper, zinc and chromium. Among them nickel and copper are preferred among others, because they have a great effect of inhibiting formation of iron-aluminum intermetallic compounds, and they are inexpensive. The methods of coating include electroless plating, electroplating, hot dipping, vapor deposition, sputtering, CVD and thermal spraying.

In the bonding method, a chamber core is set on a drag, and valve seats are set at predetermined positions of the core. The valve seats are preliminarily coated with a fluoride type flux as described above with or without nickel precoating. Further, necessary cores such as port cores and water jacket cores are set at predetermined positions of the drag, and then the drag is closed with a cope to constitute a casting mold. After a hot melt of aluminum is poured into this mold and cooled for a predetermined time, the casting mold is disassembled to obtain a cylinder head bonded with valve seats.

Figure 10:
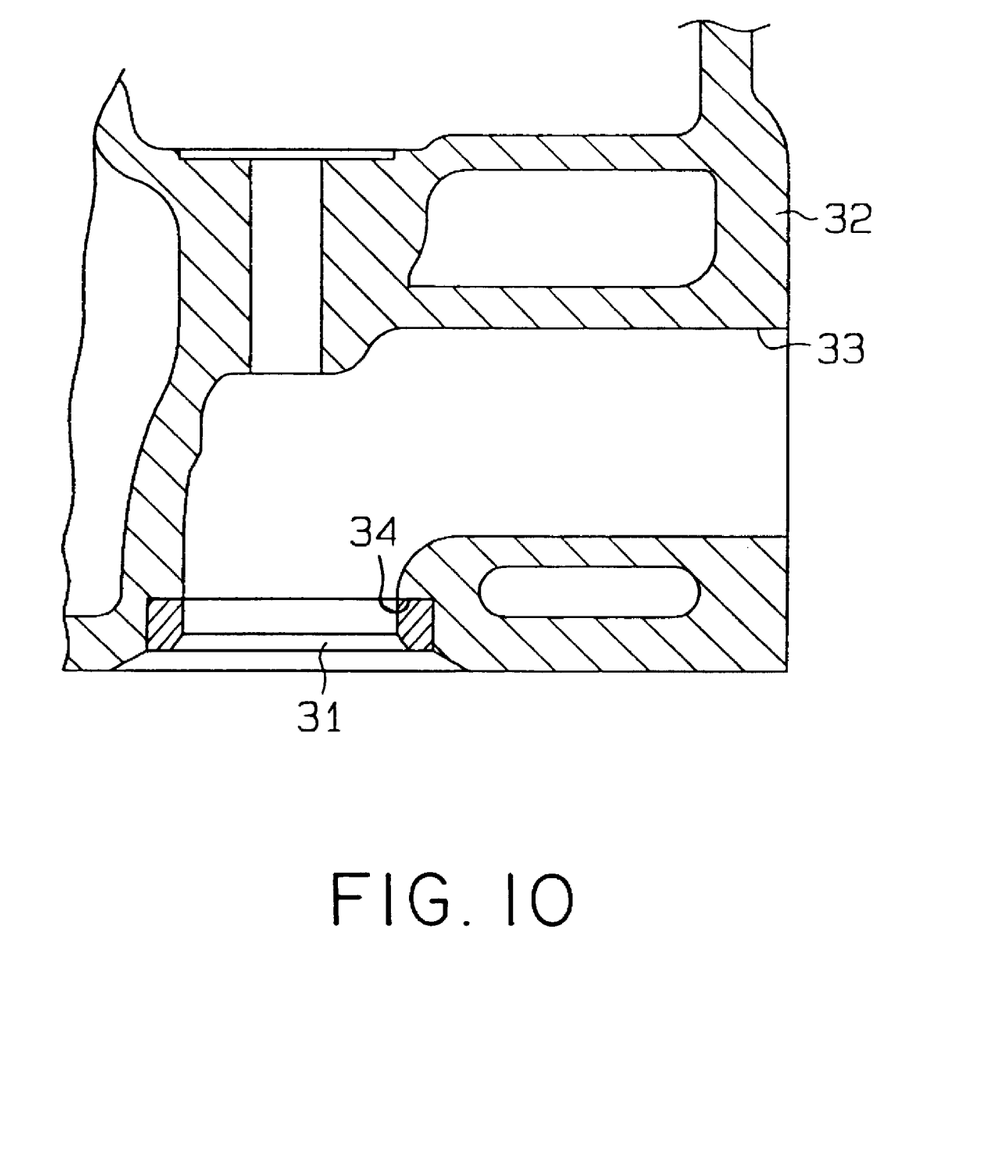
FIG. 10 is a partial cross-sectional view of the cylinder head and the valve seat completely bonded to each other.

FIG. 10 shows a state where a valve seat 31 is bonded to an opening of a port 33 of a cylinder head 32. The cylinder head 32 is molded using an Al—Si type alloy. The valve seat 31 is bonded to an annular step 34 formed around the opening of the port 33. The valve seat 31 is incorporated into the cylinder head 2 when the cylinder head 32 is cast.

Figure 9:
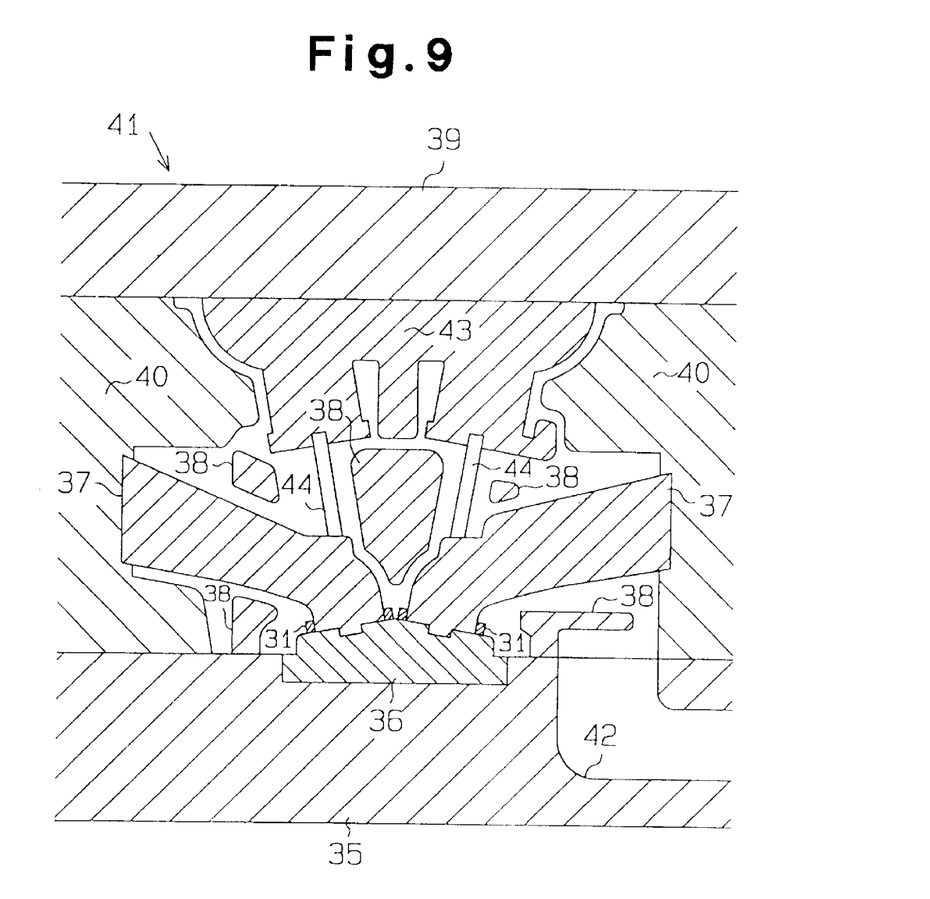
FIG. 9 shows a cross-sectional view of a casting mold.

The method for bonding the valve seat 31 will be described below. FIG. 9 shows in cross section a casting mold 41 for molding a cylinder head 32. The valve seat 31 is made of an iron type sintered alloy containing an alloying element such as Cr, Ni, Co and Mo.

Figure 8:
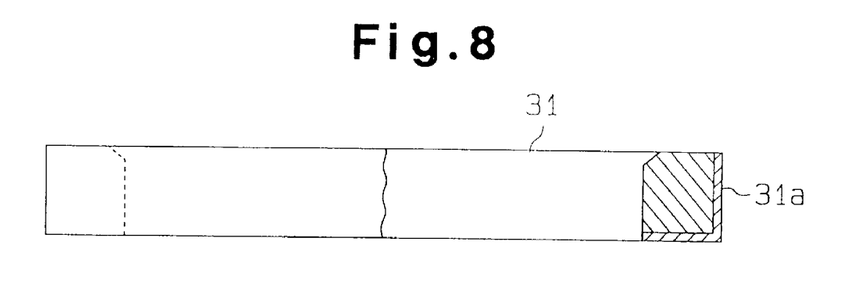
FIG. 8 shows a partially cut-away side view of a valve seat.

First, as shown in FIG. 8, Ni—P type electroless plating is applied to the urface of the valve seat 31, particularly on the outer circumferential face and bottom face which are to be bonded with the cylinder head 32 to form a nickel layer 31a having a thickness of about 5 μm.

Next, a fluoride type flux having a composition of 55 mol % CsF-45 mol % $AlF_3$ is dispersed in an ethyl alcohol solvent. The thus dispersed flux is applied on the surface of the valve seat 31.

Subsequently, as shown in FIG. 9, an intermediate die 40 disposed between a drag 35 and a cope 39 defines a cavity together with these dies 35, 39. A molten metal for casting is to be poured through a runner 42 defined in the drag 35 at a predetermined position. A chamber core 36 is placed at a predetermined position of the drag 35, and valve seats 31 precoated with a flux are set at predetermined positions of the core 36. Further, necessary cores 43 including port cores 37 and water jacket cores 38, as well as, valve guide hole molding pins 44 are set at predetermined positions of the drag 35. The drag 35 is then mated with the cope 39 via the intermediate die 40 to complete the casting mold 41.

The casting mold 41 is heated to a temperature of 450° C. so as to improve running of a hot melt throughout the mold 41. Then, a 700° C. hot melt of AC2B (JIS) aluminum is poured into the cavity through the runner 42.

Subsequently, the casting mold 41 is cooled for a predetermined time, and then the mold 41 is disassembled to obtain a cast cylinder head 32. The cylinder head 32 is integrated with valve seats 31 when the cylinder head 32 is molded.

Figure 11:
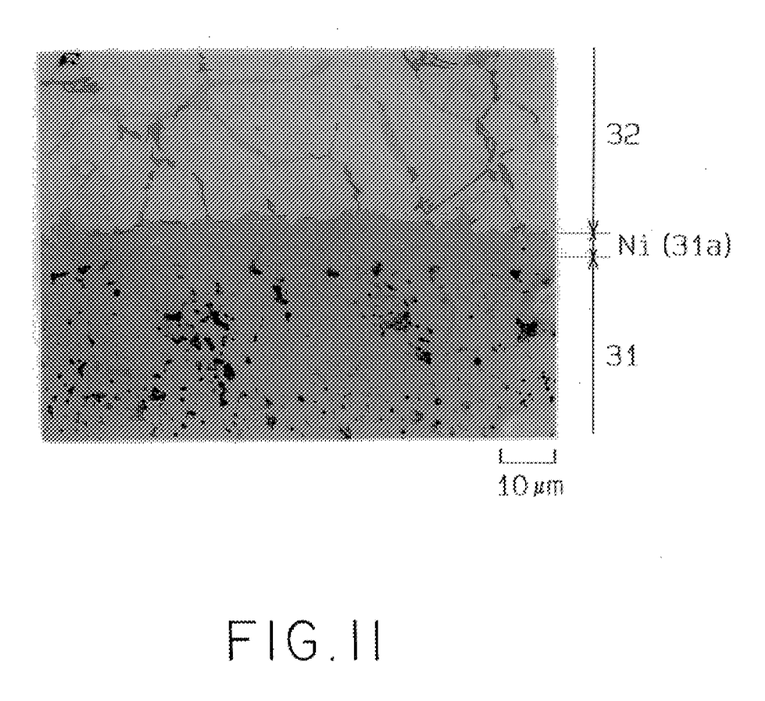
FIG. 11 is a microscopic photograph showing an enlarged cross-sectional view of the valve seat bonded with the cylinder head.

FIG. 11 is a microscopic photograph showing an enlarged cross-sectional view of the valve seat 31 bonded with a cylinder head 32 according to the bonding method described above. It can be recognized that a metallurgical bonding is formed at the interface between the valve seat 31 made of an iron type sintered material and the cast aluminum cylinder head 32. Since the valve seat 31 has a nickel layer 31a formed on the surface, it can be seen that no brittle iron-aluminum intermetallic compound is formed.

In this embodiment, the valve seat 31 integrated with the cylinder head 32 when the cylinder head 32 is molded forms metallurgical bonding with the cylinder head 32 with the aid of the fluoride type flux. The metallurgical bonding formed between the valve seat 31 and the cylinder head 32 increases the bond area between these two members 31, 32 to improve heat conductivity between the valve seat 31 and the cylinder head 32, and thus the temperature of the valve seat 31 can be lowered. The lowered temperature of the valve seat 31 reduced engine knocking. Further, the valve seat 31 need not have a fitting depth, unlike the valve seat by press fitting method; therefore, the thickness of the valve seat 31 can be reduced that much. In addition, the reduction of the thickness of casting wall between the valve seat permits the valve seat diameter and the port diameter to be increased to improve the efficiency of moving air to the combustion chamber, engine power, and fuel consumption. Moreover, the thinning of the valve seat 31 reduces the amount of material used. In addition, since the fluoride type flux contains no chloride, there is no corrosion of the valve seats 31 and cylinder head 32.

In this embodiment, the nickel layer 31a applied to the surface of the iron type valve seat 31 is present between the aluminum cylinder head 32 and the valve seat 31, so that it is difficult for the iron type material to react with aluminum to control formation of brittle iron-aluminum intermetallic compound at the interface between the valve seat 31 and the cylinder head 32. Further, the nickel layer 31a improves wettability of the aluminum hot melt to successfully form metallurgical bonding between these two members 31, 32.

Although only two embodiments of the present invention have been described herein, it should be apparent to those skilled in the art that the present invention may be embodied in many other specific forms without departing from the spirit or scope of the invention. Particularly, it should be understood that the present invention may be embodied in the following manners:

While the nickel layer 1a of the valve seat 1 is formed by Ni—P type electroless plating in the first embodiment, the nickel layer 1a may be alternatively formed, for example, by means of vapor deposition, sputtering, CVD, thermal spraying, Ni—B type electroless plating or electroplating.

While the seat valve 1 is precoated with Ni by means of plating prior to brazing in the first embodiment, the valve seat 1 may be coated a-1Hlternatively with other metals than Ni so long as they can improve wettability of the brazing material.

Figure 12:
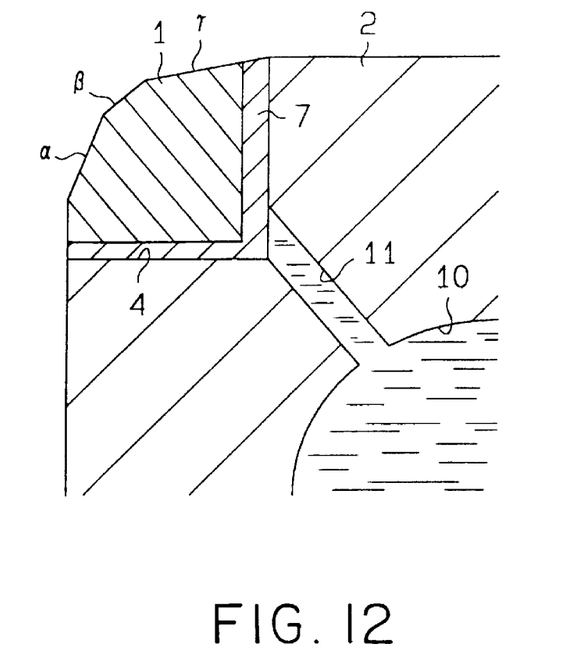
FIG. 12 shows a cross-sectional view of the valve seat completely bonded with a step.

As a variation of the first embodiment, as shown in FIG. 12, a water jacket 10 and a step 4 both defined in the cylinder head 2 may be allowed to communicate with each other via a through hole 11 which may be blocked with the brazing material 7 when the valve seat 1 is brazed. In this case, the valve seat 1 is cooled directly by the cooling water in the water jacket 10 via the brazing material 7 filling the brazing clearances. Accordingly, the cooling performance of the valve seat 1 can be improved.

Figure 13A:
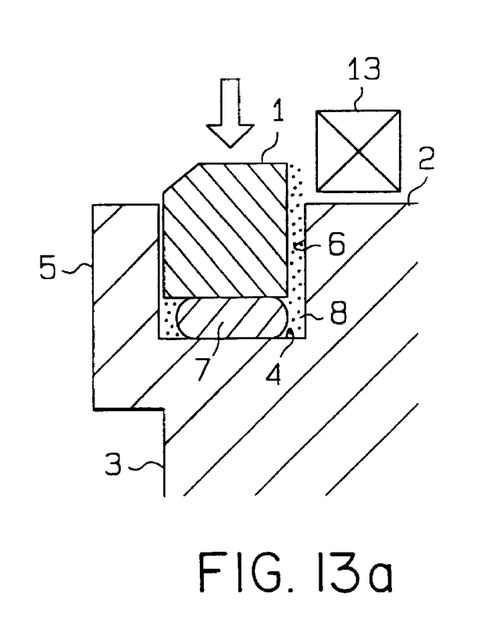
Figure 13B:
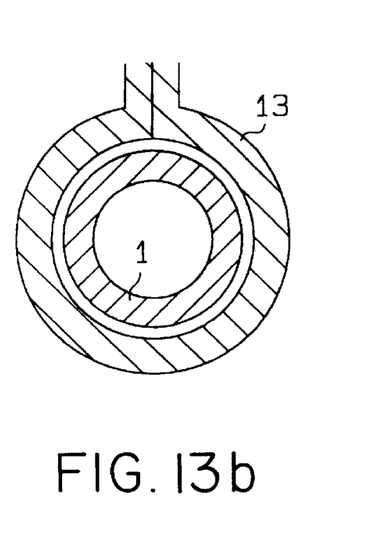

While brazing of the valve seat 1 is carried out in a furnace in the first embodiment, the valve seat 1 may be brazed by using induction heating. More specifically, as shown in FIG. 13, a round coil 13 is disposed around the annular U-groove 6, and the valve seat 1 is pressed downward by a clamp or the like. In this state, heating of the brazing material 7 and flux 8 may be carried out utilizing the high-frequency induction of the coil 13. In this case, the valve seat 1 is brazed when the brazing material 7 and flux 8 are heated to 500° C. After completion of the brazing, the bank 5 may be removed in the same manner as in the first embodiment.

Figure 14:
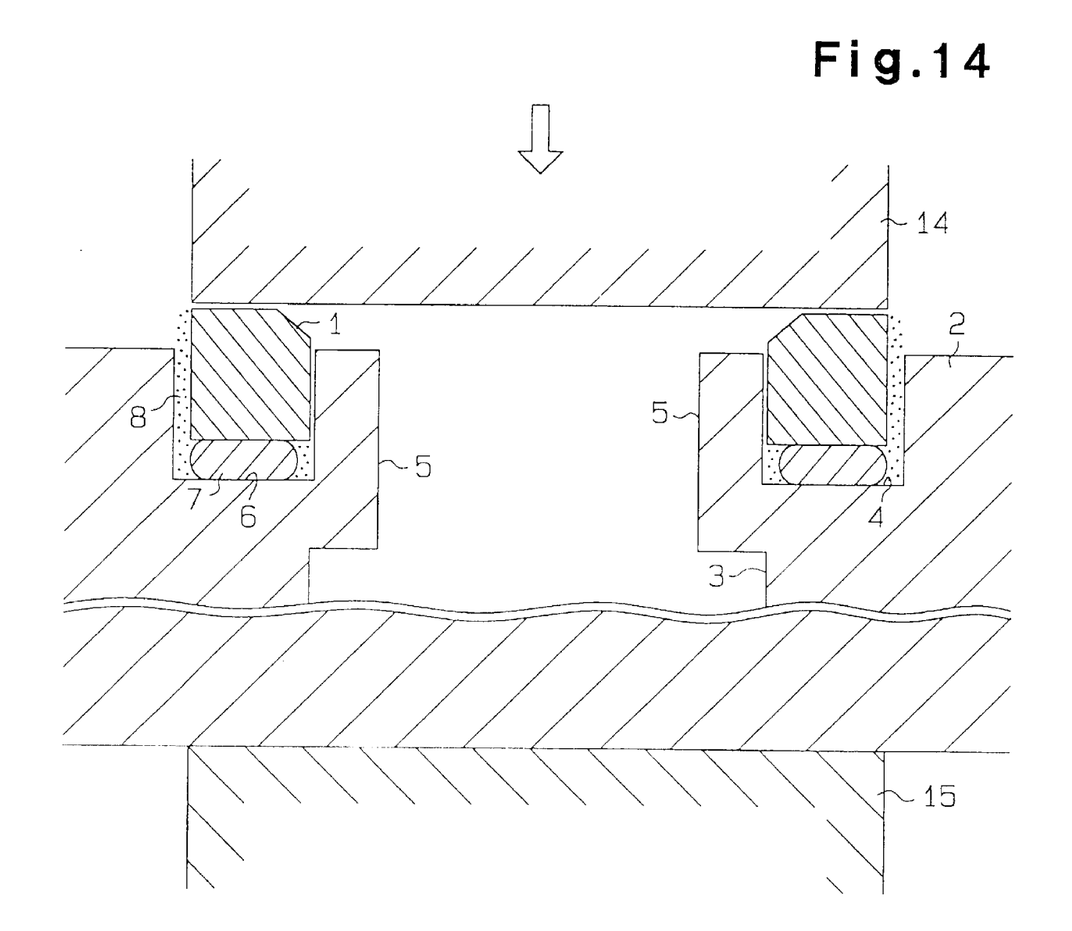
FIG. 14 shows a cross-sectional view illustrating a method where the valve seat is brazed in the U-groove.

As another alternative, the valve seat may be subjected to resistance brazing. More specifically, as shown in FIG. 14, the U-groove 6 is filled with the brazing material 7 and the fluoride type flux as in the first embodiment. Subsequently, the valve seat 1 is squeezed by a pair of electrodes 14, 15 disposed respectively on the upper surface and lower surface of the cylinder head 2. Electricity is charged across the electrodes 14, 15 to heat the resistors and melt the brazing material 7, and thus braze the valve seat 1. After completion of the brazing, the bank 5 may be removed in the same manner as in the first embodiment.

While the surface of the valve seat 31 is coated with nickel in the second embodiment, it may be coated alternatively with copper, zinc, chromium, etc.

Therefore, the present examples and embodiments are to be considered as illustrative and not restrictive, and the invention is not to be limited to the details given herein, but may be modified within the scope of the appended claims.

What is claimed is:

1. A method for bonding a valve seat with a cylinder head made of aluminum comprising the steps of:
    applying an Al—Zn type brazing material and fluoride type flux to a cylinder head made of aluminum;
    assembling a valve seat with said cylinder head; and
    brazing said valve seat with said cylinder head by using said Al—Zn type brazing material and said fluoride type flux.

2. The method as set forth in claim 1, wherein said Al—Zn type brazing material contains 70 to 90 weight percent of Zn.

3. The method as set forth in claim 2, wherein said brazing material and said flux are heated up to 470° through 520° C. in said brazing step.

4. The method as set forth in claim 1, wherein said Al—Zn type brazing material comprises Al—Zn as a base material and at least one additive selected from a group consisting of Si and Cu.

5. The method as set forth in claim 1, wherein said valve seat is coated with nickel.

6. A method for bonding a valve seat with a cylinder head comprising the steps of:
    applying brazing material and a fluoride type flux to a cylinder head wherein said cylinder head is non-molten and made of aluminum;
    assembling a valve seat of iron type metal with said cylinder head; and
    brazing said valve seat of iron type metal with said cylinder head by using said brazing material and said fluoride type flux.

7. A method for bonding a valve seat with an aluminum cylinder head comprising the steps of:
    applying a fluoride type flux on a valve seat of iron type metal;
    positioning said valve seat with an aluminum cylinder head; and
    bonding said valve seat of iron type metal and said aluminum cylinder head with said fluoride type flux wherein said fluoride type flux includes one selected from the group consisting of KF—AlF$_3$ type, CsF—AlF$_3$ type, KF—CsF—AlF$_3$, CsF—AlF$_3$—Al (OH)$_3$, KF—AlF$_3$—LiF and CsF—AlF$_3$—LiF.

8. The method as set forth in claim 7, wherein said valve seat is made of a sintered alloy comprising iron and at least one metal element selected from the group consisting of Cr, Ni, Co and Mo.

9. The method as set forth in claim 7 further comprising a step of coating the valve seat with a metal having a high affinity to the valve seat and cylinder head.

10. The method as set forth in claim 7, wherein said applying step is carried out by immersing the valve seat in a solution containing the flux and an organic solvent to disperse the flux.

11. The method as set forth in claim 9, wherein said applying step is carried out by immersing the valve seat in a solution containing the flux and an organic solvent to disperse the flux.

12. The method as set forth in claim 9, wherein said valve seat is coated with nickel.

* * * * *